United States Patent

Hung

(10) Patent No.: US 11,550,494 B2
(45) Date of Patent: Jan. 10, 2023

(54) METHOD TO SUPPORT HIGH RELIABILITY MULTIPLE TIMES PROGRAM NON-VOLATILE CONFIGURATION SETTING

(71) Applicant: MACRONIX INTERNATIONAL CO., LTD., Hsinchu (TW)

(72) Inventor: Shuo-Nan Hung, Zhubei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/166,804

(22) Filed: Feb. 3, 2021

(65) Prior Publication Data

US 2022/0244883 A1    Aug. 4, 2022

(51) Int. Cl.
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
CPC ...... G06F 3/061; G06F 3/0679; G06F 3/0655; G06F 3/0683; G06F 3/0634; G06F 3/0619; G06F 12/0246

USPC .................................................. 711/154, 103
See application file for complete search history.

(56) References Cited

U.S. PATENT DOCUMENTS

| | | | |
|---|---|---|---|
| 7,579,865 B1 * | 8/2009 | Rutledge | H03K 19/17764 326/38 |
| 9,256,551 B2 | 2/2016 | Paaske et al. | |
| 9,720,700 B1 | 8/2017 | Brown et al. | |
| 10,809,925 B2 | 10/2020 | Chen et al. | |
| 10,977,121 B2 | 4/2021 | Hung et al. | |
| 2014/0281119 A1 * | 9/2014 | Hyun | G06F 12/0646 711/102 |
| 2015/0324122 A1 * | 11/2015 | Kaminaga | G11C 16/08 711/103 |
| 2016/0246672 A1 * | 8/2016 | Yang | G06F 3/064 |
| 2018/0204773 A1 * | 7/2018 | Jeong | G11C 7/222 |
| 2019/0212999 A1 * | 7/2019 | Chen | G06F 3/0622 |
| 2020/0241768 A1 | 7/2020 | Chen et al. | |

\* cited by examiner

*Primary Examiner* — Hashem Farrokh
(74) *Attorney, Agent, or Firm* — Paul Durdik; Haynes Beffel & Wolfeld LLP

(57) ABSTRACT

A method provides the capability to maintain a configuration settings data image stored by a non-volatile memory device. The configuration settings data image can be multiple times programmed (MTP) without sacrificing reliability of the semiconductor device in the event of spurious power fluctuations, intermittent or bad memory storage blocks storing the configuration settings data image.

18 Claims, 10 Drawing Sheets

METHOD TO SUPPORT HIGH RELIABILITY MULTIPLE TIMES PROGRAM NON-VOLATILE CONFIGURATION SETTING

BACKGROUND

Field

The present invention relates to integrated circuit memory devices, such as flash devices, that support user configurability, and particularly to non-volatile semiconductor memory devices having high reliability for use in multiple times program (MTP) configuration operations.

Description of Related Art

In many modern computer memory devices, the system is configured by the user using configuration registers provided on the memory chip. For devices implementing default configuration registers with volatile setting data only, the user needs to change the configuration register after power on if the default configuration setting cannot fulfill the system requirement such as performance or security requirements.

While there are perceived advantages to this approach, the user may not be able to change the configuration register before boot. In this case, the user needs to access the memory chip with the default configuration setting in the system boot procedure, this may induce some performance or security disadvantage such as longer boot time or easier for a hacker to attack during the system boot procedure.

It is desirable to provide mechanisms for safely changing default configuration settings data, that support, maintain or improve device reliability.

SUMMARY

The disclosed technology provides default configuration (or non-volatile configuration which includes the non-volatile default configuration) updatable semiconductor memory devices and methods of updating or changing default configuration settings data of a semiconductor memory device. Default configuration settings data loss from a sudden power drop or a bad (or intermittently failing) block during Multiple Times Program (MTP) non-volatile configuration setting update operations can be avoided or reduced by using two or more blocks to store non-volatile configuration settings data; the old configuration settings data is kept until the new configuration settings data is written. In some implementations, additional flow control data is also written for this purpose. A list of good blocks can be maintained, and only good blocks are used to store the non-volatile configuration settings data, while any blocks found to be bad are removed from the block list. Additionally, a command to add additional blocks when received can implement adding new blocks to the list of available blocks.

In a representative implementation, a memory device comprises a memory array including a plurality of non-volatile memory locations arranged into blocks of memory locations, such as a first memory block and a second memory block for example, that provide non-volatile storage of one or more configuration settings data images. An input/output interface facilitates exchanging data with at least a host. One or more configuration registers that receive configuration settings data are connected by data path circuits between the memory array, and the interface. Some command decoder circuitry is responsive to commands received at the input/output interface, to read and write to memory locations in the plurality of memory locations, to direct read and write operations to blocks of storage locations among at least the first memory block and the second memory block. Logic circuitry examines validity of a configuration settings data image stored in at least one of the first memory block and the second memory block and selects a valid configuration settings data image from at least one of the first memory block and the second memory block to copy to the configuration registers.

In some implementations, whenever the logic circuitry finds more than one of the at least a first memory block and a second memory block marked as having valid configuration settings data, retrieving a valid configuration settings data image from a memory block having a most recently stored configuration settings data is performed.

In some implementations, whenever the logic circuitry finds more than one of the at least a first memory block and a second memory block marked as having valid configuration settings data, retrieving the most recently stored configuration settings data includes retrieving the valid configuration settings data image of the block with a more recent sequence number to the configuration registers.

For some implementations, the command decoder circuitry detects a host command to update the default configuration settings data, receives and stores new configuration settings data in a block selected from the at least a first memory block and a second memory block, and after the new configuration settings data is successfully stored, marks the block selected as having valid configuration settings data. Marking can be by writing labels or marks to trace progress of an update operation such that the new configuration settings data is marked valid only when the update is verified complete; thereby blocking a subsequent loading of a partial or corrupt configuration settings data image during a power fluctuation or hardware fault. Some implementations will further determine whether a previous configuration settings data image is to be erased after the new configuration is successfully stored; and responsively erase the previous configuration settings data image. For some implementations, the writing labels or marks to trace progress of an update operation includes erasing a valid block label for the previous configuration settings data image only when the update is verified complete; thereby blocking a subsequent loading of a partial or corrupt configuration settings data image during a power fluctuation or hardware fault.

In some implementations, the device includes a one-time programmable block to store bad block information, and performs building a block list of available blocks available to store configuration settings data from the one-time programmable block; and removing a bad block encountered during an update or erase operation conducted upon the at least a first memory block and a second memory block from the block list of available blocks. Some implementations further include the command decoder circuitry can detect a host command to add additional blocks to store the configuration settings data, and add the additional blocks to the block list of available blocks available to store configuration settings data from the one-time programmable block.

In some implementations the memory device includes a third memory block, and performs receiving and storing new configuration settings data in the third memory block after the second memory block and receiving and storing new configuration settings data in the first memory block after the third memory block round robin.

In another representative implementation, a method of maintaining multiple times updatable default configuration settings data in a non-volatile memory is provided. An example method includes receiving a host command to update default configuration settings data of a memory device with new configuration settings data for configuring the memory device. Default configuration settings data is stored in non-volatile storage locations among at least a first memory block and a second memory block defined in a memory array of the memory device. The method also includes selecting a target block in which to store the new configuration settings data from the at least a first memory block and a second memory block. The new configuration settings data is received and stored in the target block selected according to the method. The target block selected is marked as having valid configuration settings data once the new configuration settings data is stored.

In a further representative implementation, a memory device comprises circuitry to receive by the memory device a host command to update default configuration settings data with new configuration settings data for configuring the memory device stored in non-volatile storage locations among at least a first memory block and a second memory block defined in a memory array of the memory device. The device also includes circuitry to select from the at least a first memory block and a second memory block, a target block in which to store the new configuration settings data. Circuitry to receive the new configuration settings data and circuitry to store the new configuration settings data in the target block selected are also part of the memory device. The memory device also includes circuitry to mark the target block selected as having valid configuration settings data once the new configuration settings data is stored.

Implementations of the disclosed technology can provide improved semiconductor device reliability when used with multiple times program (MTP) default configuration operations. Other aspects and advantages of the present invention can be seen on review of the drawings, the detailed description and the claims, which follow.

DETAILED DESCRIPTION

A detailed description of embodiments of the present invention is provided with reference to the FIGS. 1-8.

Configuration registers with non-volatile configuration setting data or non-volatile default configuration setting data can be provided to store configuration settings data. Configuration settings data can differ in various applications; in some implementations, configuration settings data includes without limitation, an output strength adjustment, a protected blocks selection (protected from further write including program and erase operation), a dummy cycles number for read operation, an enable or disable ECC operation, and/or others. The default configuration setting (the power on configuration value) can be changed according to the requirements of the system; therefore, the user does not need to change the configuration setting before boot or during the boot procedure every time.

Hardware failures, although infrequent, can occur, and power losses during default configuration updates are being applied to configuration settings data stored in non-volatile memory. Thus, non-volatile configuration settings data (i.e. information used by a processor at startup by the processor in order to initialize the operating system) may be lost if the power is suddenly off during the updating operation of the non-volatile configuration settings data and the chip may not work correctly after power on. Another issue is that computer memory is subject to failure like all hardware. Such failures, even if relatively infrequent, can pose potentially adverse results if a block storing non-volatile configuration settings data experiences a fault during a program or an erase operation. Although the possibility of a block failing is very low, the chip will fail to work if the block becomes a bad block.

In general, by way of overview and in implementations, a non-volatile memory device is provided the capability to maintain, update, and/or modify a non-volatile configuration settings data image stored by the device. Employing our technology, the non-volatile configuration settings data image can be multiple times programmed (MTP) without sacrificing reliability of the semiconductor device in the event of spurious power fluctuations, intermittent or bad memory storage blocks storing the configuration settings data image, or the like.

Figure 1:
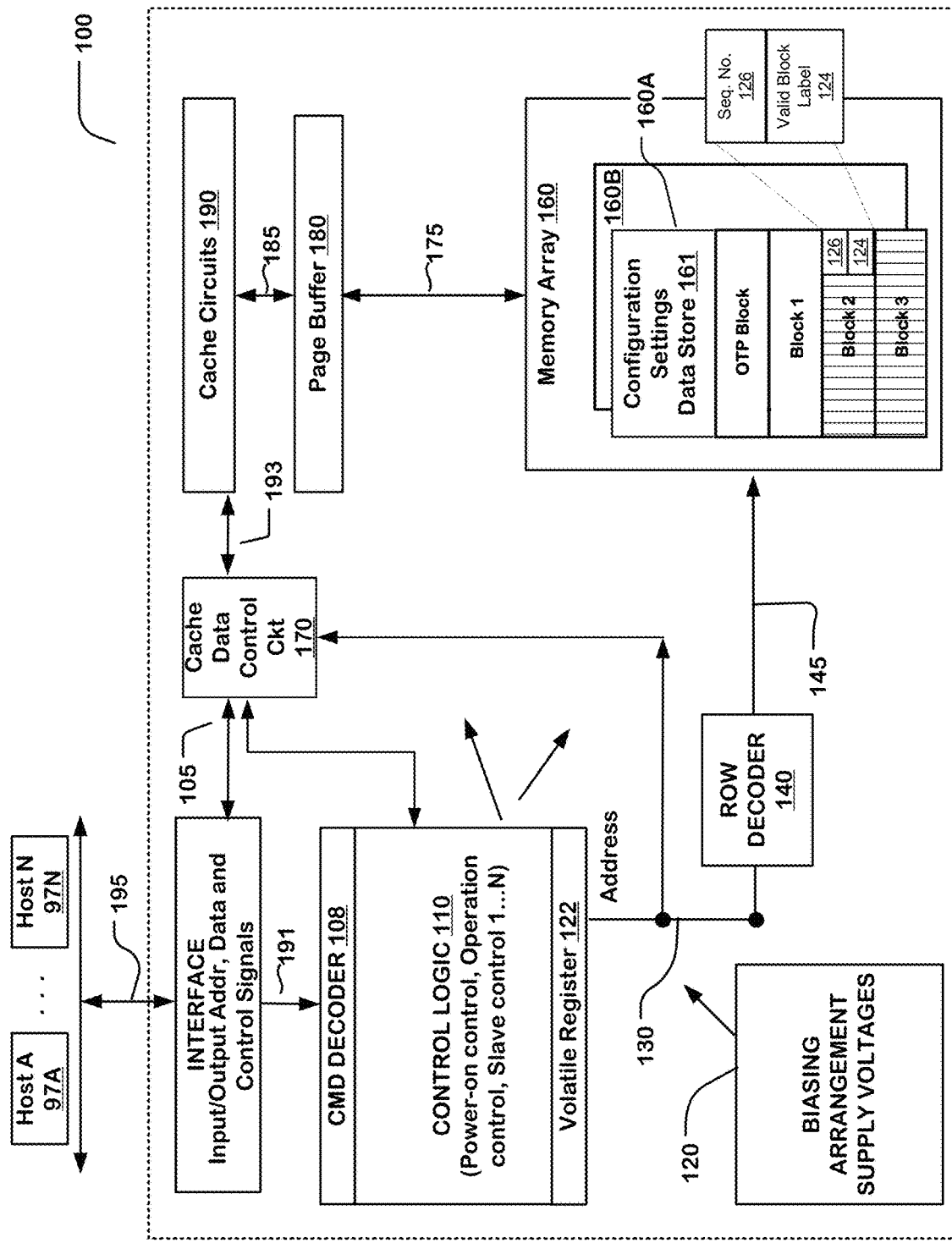
FIG. 1 is a simplified block diagram of an integrated circuit memory device suitable for embodying a mechanism for maintaining integrity in a default configuration settings data image during memory device operations.

FIG. 1 is a simplified block diagram of a memory system including a non-volatile memory device implemented on an integrated circuit suitable for embodying a mechanism for updating and managing a stored default configuration settings data image(s) as described herein. The default configuration updatable memory device can be implemented on a single integrated circuit chip, on a multichip module, or on a plurality of chips configured as suits a particular need. This diagram is merely an example, which should not unduly limit the scope of the claims herein. One of ordinary skill in the art would recognize other variations, modifications, and alternatives.

As shown, integrated circuit device 100 includes control logic 110 having a mechanism for modifying the stored copies of configuration settings data images that includes embedded logic circuitry that coordinates the actions of volatile register (s) 122, together with storage blocks, e.g., block 1, block 2, block 3, OTP block, in non-volatile memory and storage locations for sequence number 126 and valid block label 124 in memory array 160 to load stored configuration settings information into the volatile register(s) 122 and write to/read from the memory array 160 non-volatile configuration settings data. The volatile register(s) 122 can include the following data in an implementation, (i) configuration settings data; (ii) the available block list; (iii) the valid block address; and (iv) the latest sequence number if needed. Control logic 110 can implement slave control logic responsible for the update of the volatile register(s) 122 and output from the register 122 data to related circuit(s) to: (a) load data from volatile register to cache circuits 190 or read data from cache circuits 190 to the volatile register(s) 122; (b) send the register data to interface or update the register data from the register input; and (c) perform data comparison between old and new data if needed.

Volatile register(s) 122, together with storage blocks, e.g., block 1, block 2, block 3, OTP block, in non-volatile memory, are also used to modify stored configuration settings information whenever a command to change the default configuration settings data is received from the 97A by the memory device. The configuration settings data is store in the volatile register(s) 122 and written to/read from the memory array 160 for non-volatile configuration data. During an update operation, the non-volatile configuration settings data will be written to the memory array 160. In an implementation two or more program operations are used to guarantee the data integrity. A first program operation writes the configuration settings data and the sequence number (if needed) to the new block. Then a second program operation writes the valid label to the new block. In some implementations, another program operation may be used to guarantee the erase of the old block by writing another label to the new block. In these implementations, the configuration settings data image in the volatile register 122 (i.e., new configuration received for an update) is compared with the configuration settings data image stored in the non-volatile memory block (i.e., a current or "old" configuration), and the control logic 110 will check the different bits to perform this comparison operation. If one of the newest configuration bits (in the volatile register 122) among the different bits is in erase state, then an erase operation of the "old" configuration settings data from the non-volatile memory block is signaled. On the other hand, if all the newest configuration bits (in the volatile register 122) among the different bits are in program state, then there is no need for performing the erase operation.

Sequence number 126 comprises a sequence number used to distinguish which block is the most recently updated block. In an implementation and by way of example, the sequence number may be 3 bits. (In some implementations, 2 bits are enough. Other implementations may include greater or less numbers of bits) If the sequence number in a first memory block, block 1 is "2", then the sequence number "3" will be programmed to the second block, block 2. If the sequence number in block 2 is "7", then the sequence number "0" will be programmed to the block 1.

During an initialization operation responsive to a power on or a boot command, the stored valid configuration settings data is copied from the block of non-volatile memory into the volatile register circuit 122 for use in configuring the device's functionality. The non-volatile configuration settings data and the available block list are downloaded from memory array to the volatile register. It will also record the valid block address and the latest sequence number in the volatile register.

Integrated circuit memory device 100 includes a memory array 160 including single-level cells (SLC) or multiple-level cells (MLC) that store two or more bits of data per cell, on an integrated circuit substrate. The memory array 160 can be a NAND flash memory implemented using two-dimensional or three-dimensional array technology.

A row decoder 140 is coupled to a plurality of word lines 145, and arranged along rows in the memory array 160. The row decoder 140 also decodes a plurality of block select lines such as SSL lines and GSL lines used to select the block, and WL lines. A cache data control circuit 170 is coupled to cache circuits 190 by a plurality of bit lines 193 to select the target data in the cache circuits 190 to output data read from or input data written to the memory array 160. A bus including address lines 130 and data lines 105 is illustrated in this example. Addresses are supplied on address lines 130 from control logic 110 implementing a command decoder 108 and controller modules, to cache data control circuit 170 and to row decoder 140. In other examples, an input/output port may be used in which addresses and data may be provided on shared lines in an address/data bus. Also, serial interfaces may be deployed.

Page buffer circuits 180 are coupled to the memory array 160, in this example via first data lines 175. The page buffer circuits 180 can store pages for multiple-level programming, for MLC cells in a block of cells arranged for page programming.

The page buffer circuits 180 can include circuits for selectively applying program and inhibit voltages to bit lines in the memory in response to the data values in the page buffer circuits 180 and control signals that set the program algorithm to be applied.

Sensed data from the page buffer circuits 180 are supplied via second data lines 185 to cache circuits 190, which are in turn coupled to cache data control circuit 170 via a data path 193. Also, input data is applied in this example to the cache circuits 190 on lines 193, and to the page buffer circuits 180 on lines 185, for use in support of multiple-level program operations as described herein. One implementation of memory array 160 stores configuration settings data in storage blocks e.g., block 1, block 2 and block 3 of memory array 160. An OTP block specifies the storage locations available for storing configurations settings data and is useful for preventing the (re-) use of bad blocks. In some implementations, the configuration settings data blocks have associated storage locations 124, 126 for storing status information e.g., valid data in block, sequence number indicating order in which the data in the block was written, etc., about the associated block. Some configuration setting blocks are interleaved among different memory planes 160A, 160B. It results in an area of multiple blocks distributed into different planes. Interleaved blocks of memory locations in different planes enables embodiments to conduct swapping operation and even later recovering operation in memory devices in which read while write is implemented. Some implementations may omit separate memory planes, relying instead on a uniform array. On the other hand, some implementations may include more than two memory planes depicted by FIG. 1.

Input/output circuits 191 provide communication paths for the data with destinations external to the memory device 100. Input/output data and control signals are moved via data lines 105 between the input/output circuits 191, the control logic 110 and input/output ports on the memory device 100 or other data sources internal or external to the memory device 100, such as a general purpose processor or special purpose application circuitry, or a combination of modules providing system-on-a-chip functionality supported by the memory array 160.

The memory array 160 can comprise floating gate memory cells or dielectric charge trapping memory cells configured to store multiple bits per cell, by the establishment of multiple program levels that correspond to amounts of charge stored, which in turn establish memory cell threshold voltages VT. The description herein is based on the use of charge trapping memory cells, such as floating gate flash memory and dielectric charge trapping flash memory. The technology can be used with other memory cell technologies. In other examples, the memory cells may comprise programmable resistance memory cells, configured for multiple bits per cell, by the establishment of multiple program levels that correspond to amounts of resistance. Memory devices as described herein can be implemented using multichip modules, stacked chips and other configurations as well. The memory device can be implemented on a single integrated circuit chip, on a multichip module that includes one or more integrated circuits in a common package, or on a plurality of chips configured to suit a particular need.

In the example shown in FIG. 1, control logic 110 includes circuits implementing a bias arrangement state machine, or machines, which controls, or control, the application of supply voltages generated or provided through the voltage supply or supplies (120 in FIG. 1), such as read, verify and program voltages for a set of selectable program and read operations used in the operating methods described herein. The control logic 110 are coupled to the cache circuits 190 and the memory array 160 and other elements of the integrated circuit as needed. The circuitry in the control logic 110 include logic to control multiple-level program operations described in more detail below. The control logic 110 can include modules implemented using special-purpose logic circuitry as known in the art. In alternative embodiments, the control logic 110 can include modules implemented using a general-purpose processor, which can be implemented on the same integrated circuit, which executes a computer program to control the operations of the memory device 100. In yet other embodiments, a combination of special-purpose logic circuitry and a general-purpose processor can be utilized for implementation of modules in control logic 110.

In the illustrated embodiment, control logic 110 can further include a set of parameter registers included on the memory device 100 and coupled to control logic 110. The parameter registers can store parameters for a plurality of selectable program operations and a plurality of selectable read operations, which are selectable according to the processes described herein. For example, the parameter registers can comprise volatile registers 122 to keep configuration setting information during a configuration settings information readout process for example. Some implementations will have more than one of these registers. Some implementations will not need all of the registers shown in FIG. 1. While some implementations may include additional registers not shown in FIG. 1 for clarity sake. Other parameter registers (not depicted by FIG. 1 for clarity sake) can store program verify voltage levels and read voltage levels used in different program and read operations. Also, the parameter registers can store details of program sequences, such as pulse height, pulse width, and pulse magnitude increments, used in programming algorithms such as incremental stepped pulse programming ISPP algorithms. Parameter registers can store data such as address, numbers, data image lengths, check-sums, and so on.

In implementations, the host 97A can comprise a general purpose processor, a special purpose processor, a processor configured as a memory controller, or other processor that uses the memory device 100. All or part of the host 97A can be implemented on the same integrated circuit as the memory. Although the above has been shown using a selected group of components for the integrated circuit device, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

Having described an example configuration settings data maintenance architecture for a storage memory, next examples of update/change and select/use operations conducted upon configuration settings data using the configuration logic mechanisms like that of FIG. 1 will be described with reference to state diagrams of FIGS. 2B, 5B, 5C, 6B, and 7B, and flowcharts of FIGS. 2A, 3, 4, 5A, 6A, 7A, and 8.

Embedded Default Configuration Modification Operations

Figures 2A, 2B:
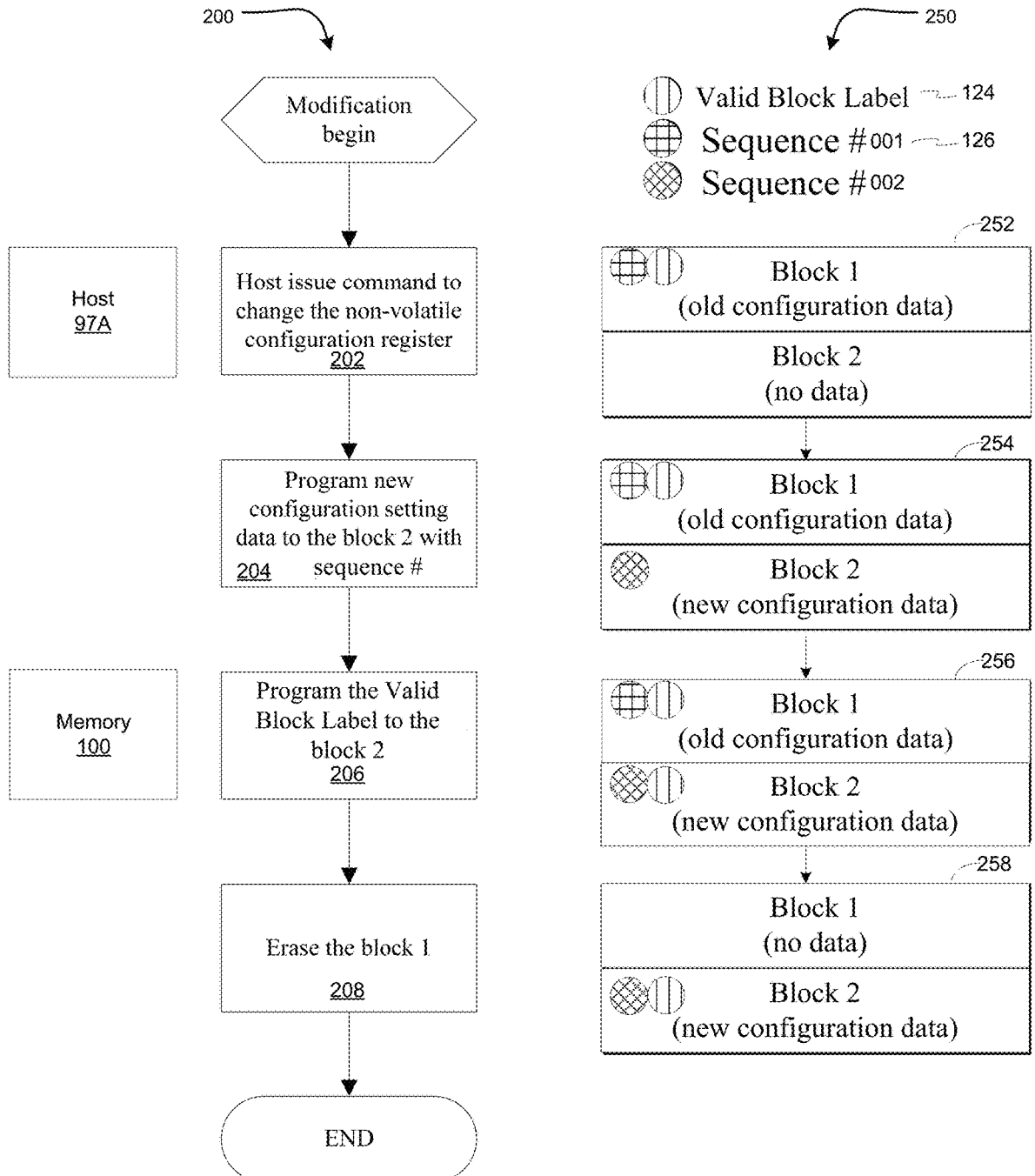
FIG. 2A is a flowchart illustrating a default configuration settings data update operation for an integrated circuit memory device like that of FIG. 1.
FIG. 2B is a state diagram illustrating example state transitions for the integrated circuit memory device resulting from the default configuration update operation like that of FIG. 2A.

Now with reference to flowchart 200 of FIG. 2A and state diagram 250 of FIG. 2B, an example of an embedded configuration modification operation for a configuration settings data image stored in a non-volatile block of the memory array 160 will be described. FIG. 2A is a flowchart illustrating a default configuration settings data update operation for an integrated circuit memory device like that of FIG. 1 and FIG. 2B is a state diagram illustrating example state transitions for the integrated circuit memory device resulting from the default configuration update operation like that of FIG. 2A. In this example, two blocks are used to store the configuration settings data. Valid block label 124 stores information indicating the block having the configuration settings data that is valid. Sequence number 126 is a sequence number that is added to trace the progress of the update operation. A representative process for modifying the default configuration settings data will now be described.

In block 202, a host command is received from the host 97A to change the non-volatile configuration settings data in the non-volatile memory blocks that store data in configuration settings data store 161. With reference to FIG. 2B, in state 252, block 1 holds existing "old" configuration settings data in use. Valid block label 124 indicates that block 1 is valid configuration settings data. Sequence number 126 indicates the sequence number of block 1.

In block 204, the control logic 110 of memory 100 begin to store the new configuration settings data to the empty block (block 2 in this example) and increments and the sequence number 126 for that block. Noteworthy is that the data may already be in the volatile registers 122. Each block reserves an area to store the sequence number; the sequence number is read out of this reserved area in the chip power on sequence or after the default configuration modification operation. With reference to FIG. 2B, FIG. 2B shows state 254 depicting the results of processing of block 204 of FIG. 2A, in which the new configuration settings data has been written to block 2 and contemporaneously the next sequence number has been assigned to block 2. Block 1 continues to have the valid block label associated with it and retains its (now penultimate) sequence number.

In block 206, after the new configuration settings data and new sequence number are successfully stored into block 2, the valid block label data is written to block 2. With reference to FIG. 2B, in state 256, block 2 contains the new configuration settings data, the sequence number written in block 204 and the valid block label written in block 206.

In block 208, the control logic 110 erases the block 1, readying it for next update. With reference to FIG. 2B, in state 258, block 1 is empty after erasure. Block 2 contains the new configuration settings data, the valid block label and the new sequence number.

Power on with New Configuration Information

Figure 3:
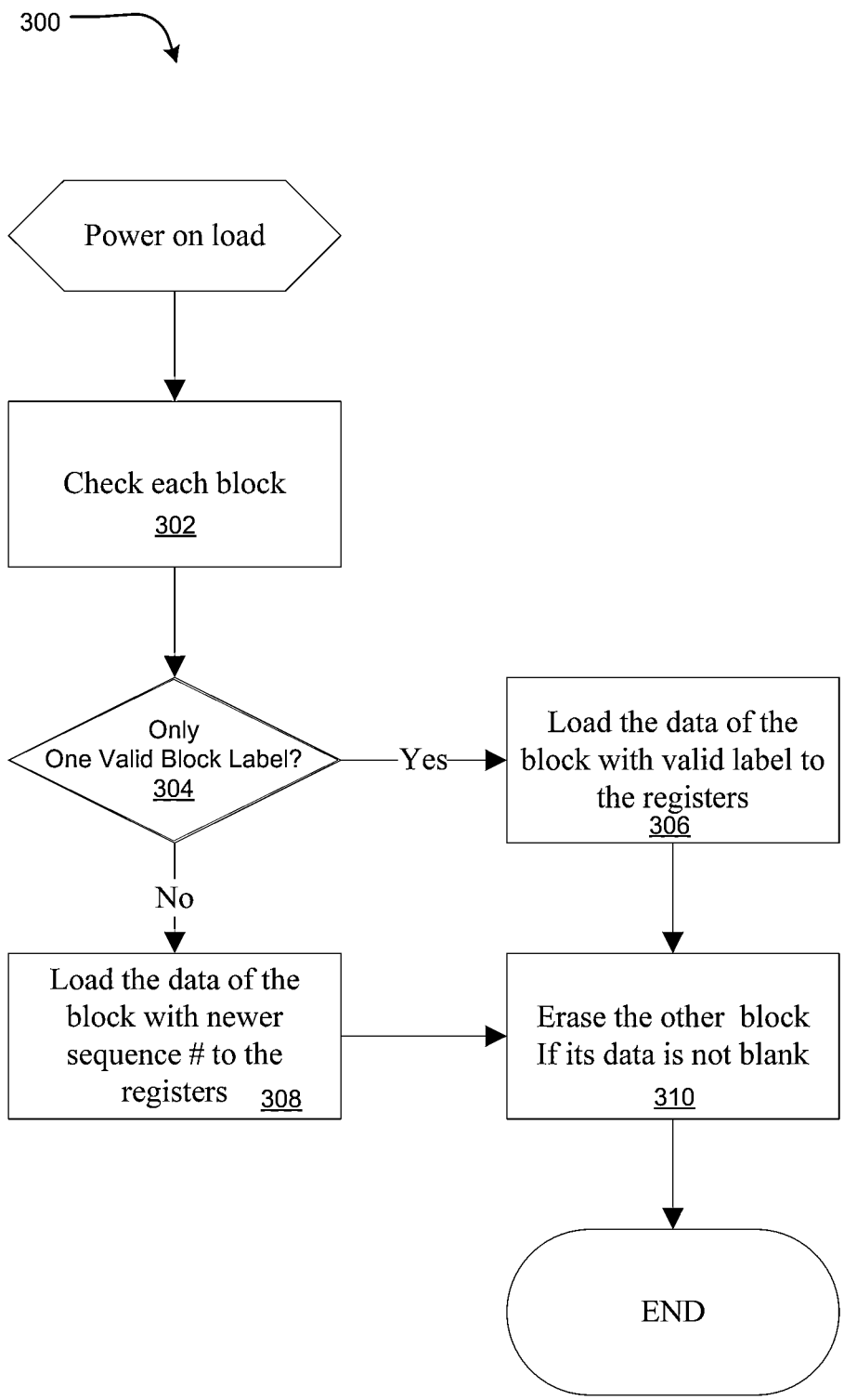
FIG. 3 is a flowchart illustrating a power on load of configuration information for an integrated circuit memory device using a default configuration update process like that of FIG. 2A.

Now with reference to flowchart 300 of FIG. 3, a process of loading configuration settings data at power on is described. FIG. 3 is a flowchart illustrating a power on load of configuration information for an integrated circuit memory device like that of FIG. 1. After power on, the control logic 110 of memory 100 will search for the newest valid block and load the configuration settings data stored. The valid block label and sequence number are used to locate the valid block. In the case of one valid block label is found by control logic 110, the valid block is the block with valid block label. In the case of two valid block labels are found by control logic 110, the valid block is the block with newest (e.g., highest if incrementing) sequence number.

In block 302, the control logic 110 checks each block for the valid block labels.

In block 304, if there is only one valid block label found, then in block 306, the control logic 110 of the memory 100 loads the data of the block corresponding with the valid block label to the configuration registers 122.

Otherwise if there are two valid block labels, then in block 308, the control logic 110 loads the data of the block with newest sequence number to the configuration registers 122.

In block 310, the control logic 110 erases the other block if its data is not blank.

Embedded Default Configuration Modification with Erase Operation Skip

Figure 4:
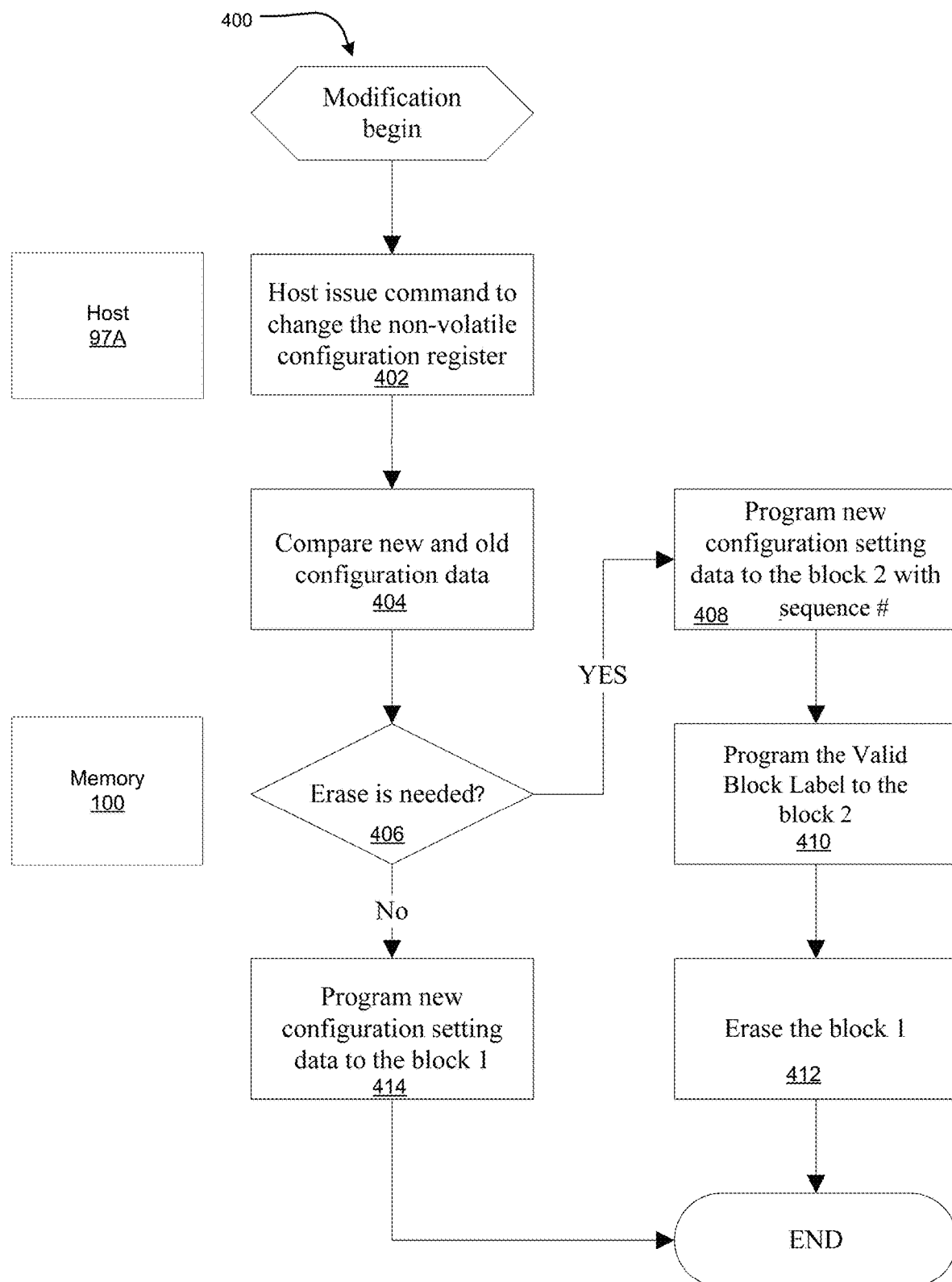
FIG. 4 is a flowchart illustrating default configuration settings data update with erase operation skip for an integrated circuit memory device like that of FIG. 1.

Now with reference to flowchart 400 of FIG. 4, an example of an embedded default configuration modification operation for a configuration settings data image stored in a non-volatile block of the memory array 160 will be described. FIG. 4 is a flowchart illustrating default configuration settings data update with erase operation skip for an integrated circuit memory device like that of FIG. 1. In this implementation, the control logic 110 of memory 100 compares the new and old configuration settings data to check whether an erase is needed or not. In this implementation, the cycle count may be reduced because erase is not necessary every time.

In block 402, a host command is received from the host 97A to change the default configuration of the configuration registers with non-volatile setting data or non-volatile default setting data.

In block 404, the control logic 110 of memory 100 compares the new (e.g., received update) configuration settings data and the old (existing) configuration settings data to determine whether an erase is needed. The configuration settings data image in the volatile register 122 (i.e., new configuration received for an update) is compared with the configuration settings data image stored in the non-volatile memory block (i.e., a current or "old" configuration), and the control logic 110 will check the different bits to perform this comparison operation.

In block 406, if one of the newest configuration bits (in the volatile register 122) among the different bits is in erase state, then an erase operation of the "old" configuration settings data from the non-volatile memory block is signaled. On the other hand, if all the newest configuration bits (in the volatile register 122) among the different bits are in program state, then there is no need for performing the erase operation.

In block 408, if the comparison indicates that an erase is needed, then the new configuration settings data and a new sequence number are stored to block 2 (e.g., in state 254 of state diagram 250 of FIG. 2B).

In block 410, the valid block label is set to block 2 (e.g., in state 256 of state diagram 250 of FIG. 2B).

In block 412, the old configuration settings data in block 1 (e.g., in state 258 of state diagram 250 of FIG. 2B) is erased.

Otherwise, if the comparison indicates that an erase is not needed, then the new configuration settings data is written to block 1 (not shown in FIG. 2B for clarity sake). This is still a regular program operation. The Flash 100 allows the user to program partial data each time, therefore, the user may program 10 bits in the first program and program another 5 bits in a next time.

Figures 5A, 5B:
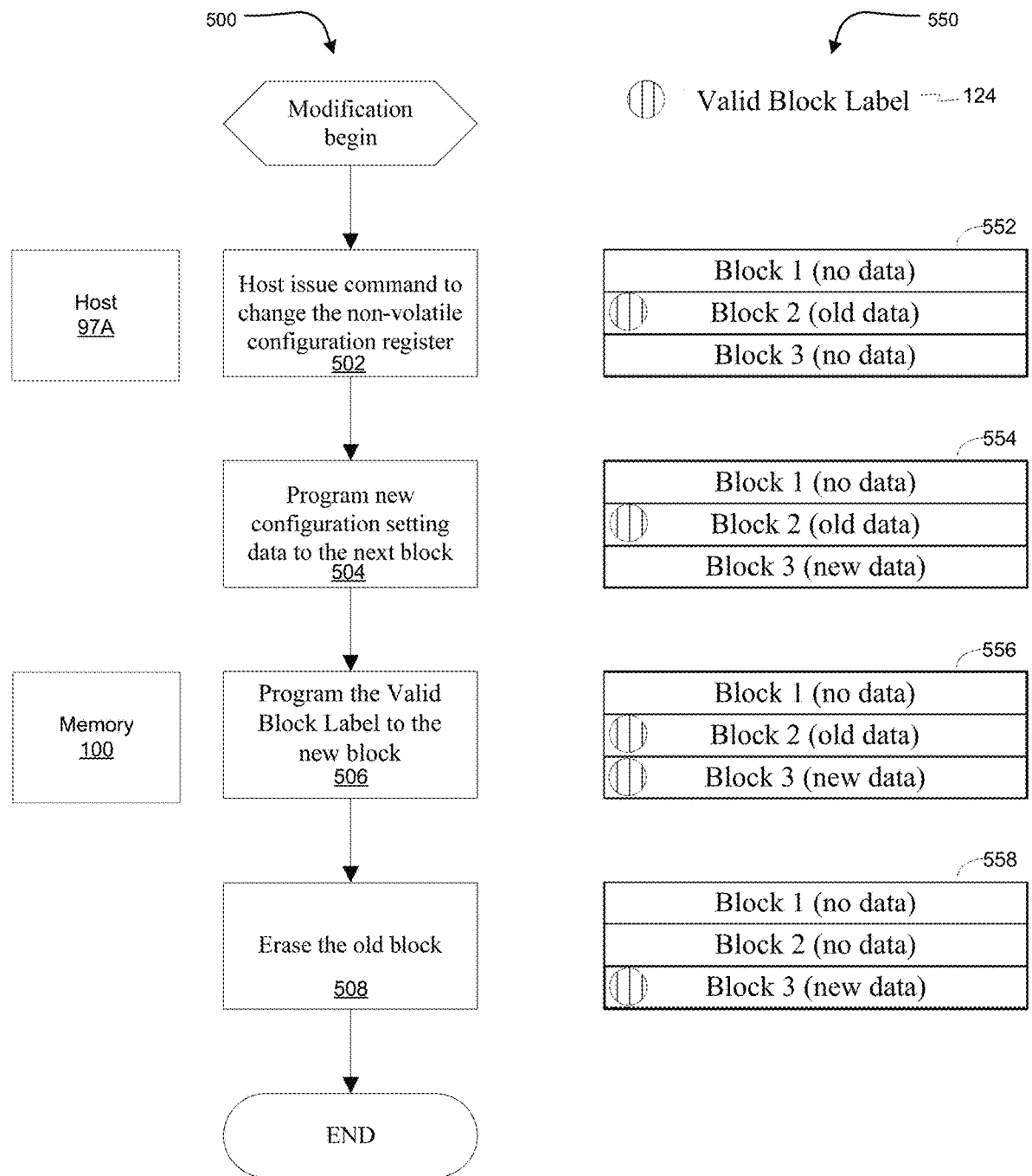
FIG. 5A is a flowchart illustrating a default configuration settings data update operation using greater than two blocks for another integrated circuit memory device like that of FIG. 1.
FIG. 5B is a state diagram illustrating example state transitions for the integrated circuit memory device resulting from the default configuration update operation like that of FIG. 5A.

Embedded Default Configuration Modification Operations Using Greater than Two Blocks Now with reference to flowchart 500 of FIG. 5A and state diagram 550 of FIG. 5B, an example of an embedded default configuration modification operation for a configuration settings data image stored in greater than two blocks of a non-volatile block of the memory array 160 will be described. FIG. 5A is a flowchart illustrating a default configuration settings data update operation using greater than two blocks for an integrated circuit memory device like that of FIG. 1 and FIG. 5B is a state diagram illustrating example state transitions for the integrated circuit memory device resulting from the default configuration update operation like that of FIG. 5A. In this example, three blocks are used to store the configuration settings data. Valid block label 124 stores information indicating the block having the configuration settings data that is valid. The sequence number is not needed in this implementation and the control logic 110 of memory 100 can identify which block is the newest one from the block number. A representative process for modifying the default configuration settings data will now be described:

In block 502, a host command is received from the host 97A to change the default configuration of the configuration registers with non-volatile setting data or non-volatile default setting data. With reference to FIG. 5B, in state 552, block 2 holds existing "old" configuration settings data in use. Valid block label 124 indicates that block 2 is valid configuration settings data. Block 1 and block 3 are empty/hold no data.

In block 504, the control logic 110 of memory 100 begins to store the new configuration settings data to the next empty block (block 3 in this example). With reference to FIG. 5B, in state 554, the new configuration settings data has been written to block 3. Block 2 continues to have the valid block label associated with it and retains its (now penultimate) configuration settings data.

In block 506, after the new configuration settings data is successfully stored into block 3, the control logic 110 of memory 100 writes the valid block label to block 3. With reference to FIG. 5B, in state 556, block 3 contains the new configuration settings data written in block 504 and is marked with the valid block label by block 506. Block 2 continues to have the valid block label associated with it and retains its (now penultimate) configuration settings data.

In block 508, the control logic 110 erases the block 2 including the valid block label for block 2, readying it for next update. With reference to FIG. 5B, in state 558, block 2 is empty after erasure. Block 3 contains the new configuration settings data and the valid block label. Block 1 remains empty.

Figure 5C:
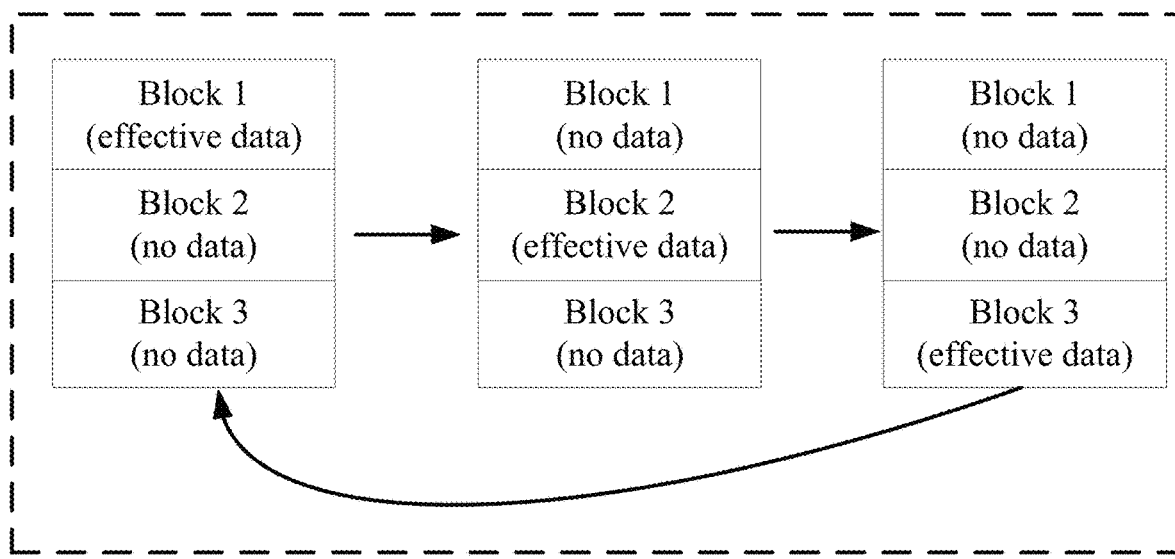
FIG. 5C illustrates a scenario of when more than two blocks being used to store configuration settings data in a default configuration update operation like that of FIG. 5A.

As shown in FIG. 5C, if more than 2 blocks are used to store configuration settings data, the blocks are used to store the configuration settings data in rotation. In this case, each block will be used to store the configuration settings data in sequence.

Power on with New Configuration Information Using Greater than Two Blocks

Figures 6A, 6B:
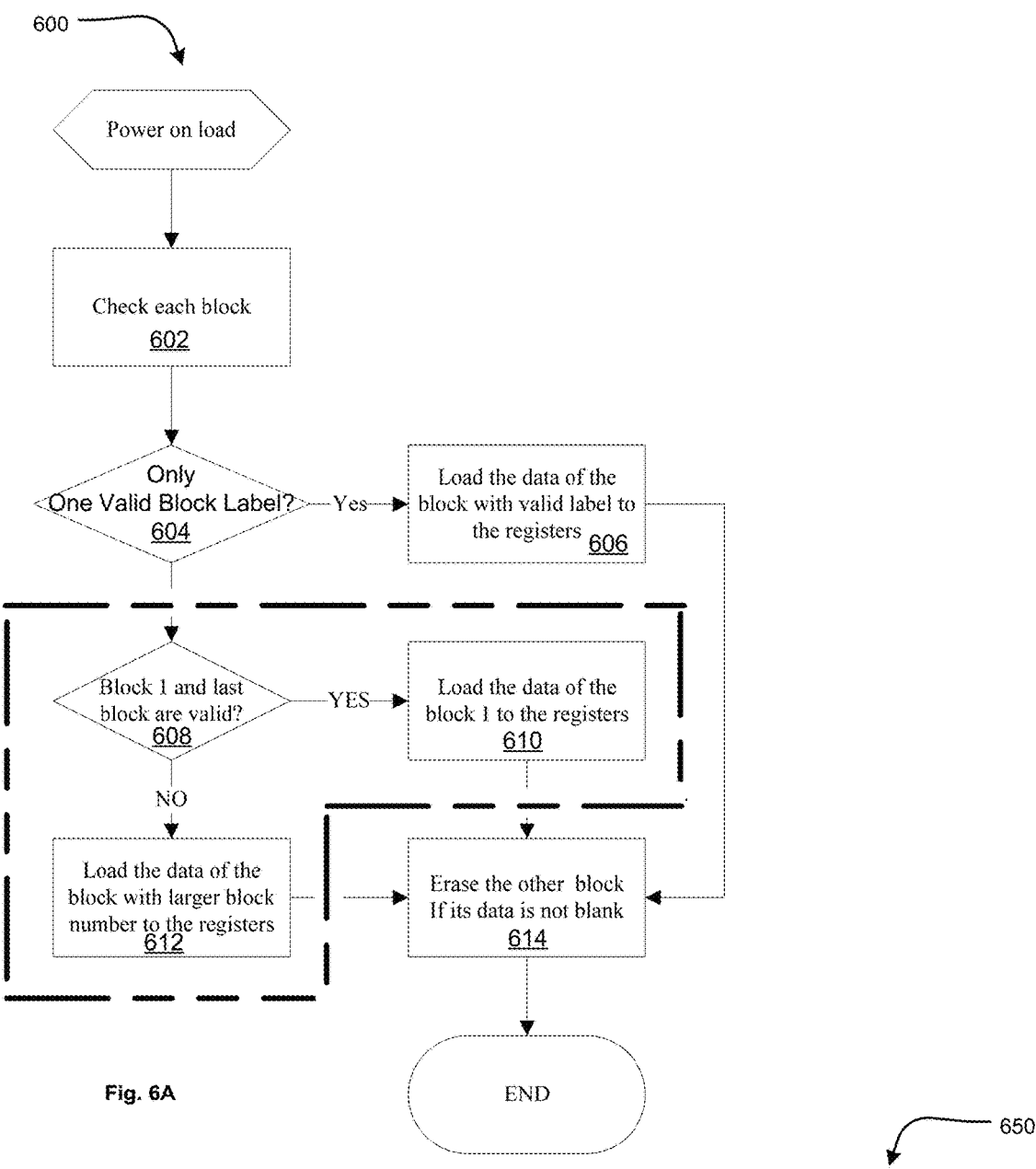
FIG. 6A is a flowchart illustrating a power on load of configuration information for another integrated circuit memory device using a default configuration update process like that of FIG. 5A.
FIG. 6B is a state diagram illustrating example state transitions for the integrated circuit memory device using a default configuration update process like that of FIG. 5A.

Now with reference to flowchart 600 of FIG. 6A, a process of loading configuration settings data at power on is described. FIG. 6A is a flowchart illustrating a power on load of configuration information for another integrated circuit memory device using a configuration update process like that of FIG. 5A. After power on, the control logic 110 of memory 100 will search for the newest valid block and load the configuration settings data stored. The valid block label is used to locate the valid block. In the case of one valid block label is found by control logic 110, the valid block is the block with valid block label. In the case of two valid block labels are found by control logic 110, the valid block is the block with the latest updated data based on the block update sequence in FIG. 5C.

In a block 602, the control logic 110 checks each block for the valid block labels.

In block 604, if there is only one valid block label found, then in block 606, the control logic 110 of the memory 100 loads the data of the block corresponding with the valid block label to the volatile configuration registers 122.

Otherwise, if there are two valid block labels, then in block 608, the control logic 110 checks if block 1 and the last block are valid.

In block 610, if block 1 and the last block are valid, the control logic 110 loads the data from block 1 into the configuration registers 122.

Otherwise, if block 1 and the last block are not valid, then in block 612, the control logic 110 loads the data of the block with greatest block number to the configuration registers 122.

In block 614, the control logic 110 erases the other block if its data is not blank.

FIG. 6B is a state diagram illustrating example state transitions 650 for the integrated circuit memory device using a configuration update process like that of FIG. 5A.

Figure 7A:
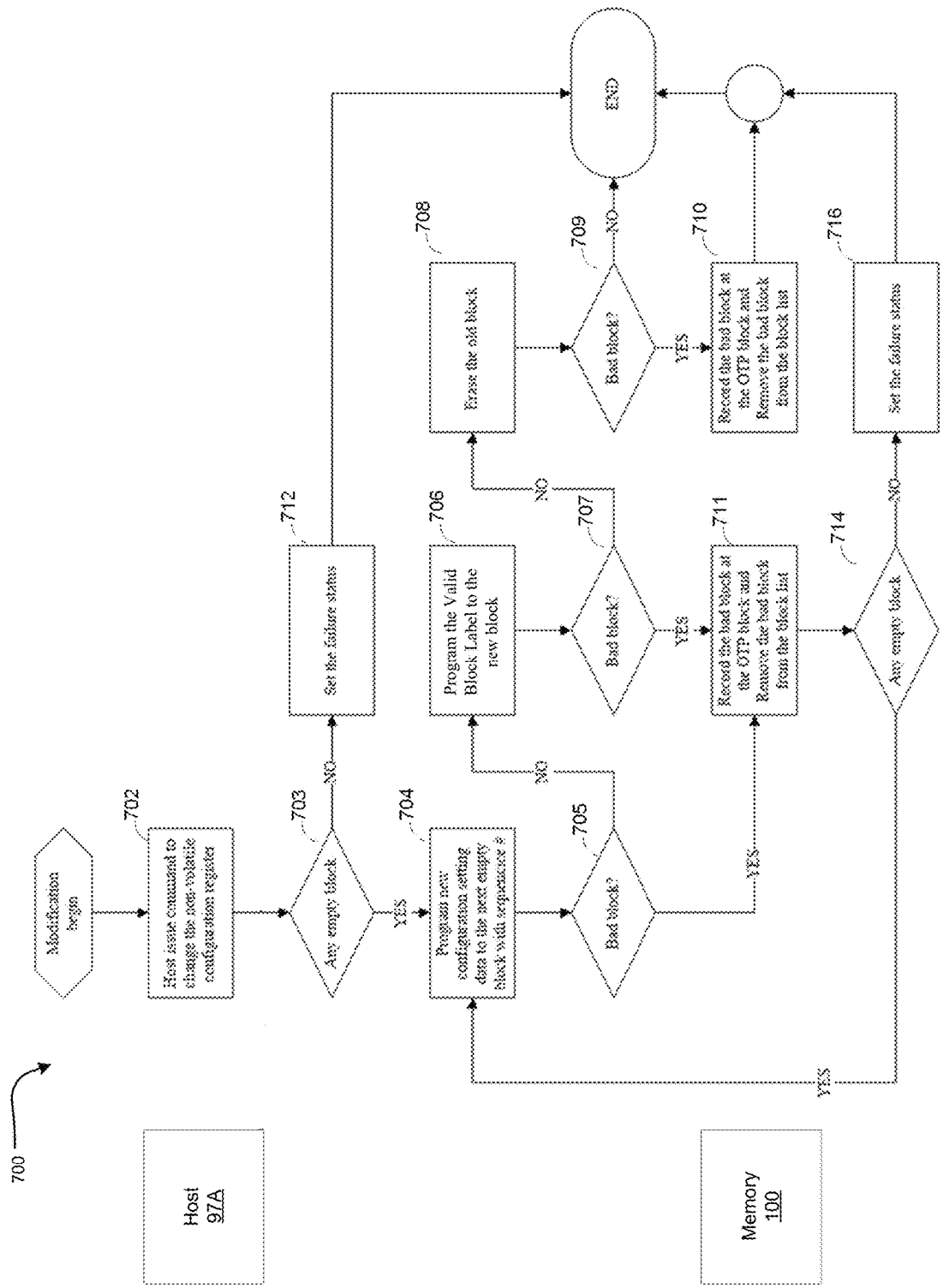
FIG. 7A is a flowchart illustrating a default configuration settings data update operation using greater than two blocks and a one-time programmable (OTP) block to store bad block information for an integrated circuit memory device like that of FIG. 1
Figure 7B:
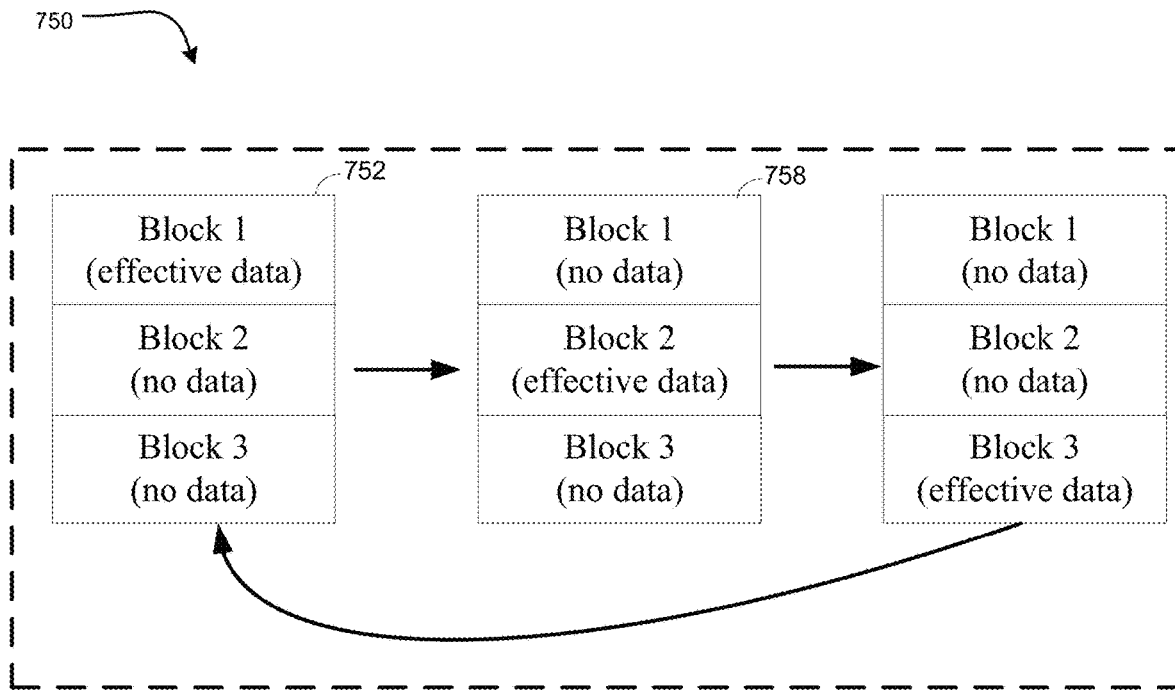
FIG. 7B is a state diagram illustrating example state transitions for the integrated circuit memory device resulting from the default configuration update operation like that of FIG. 7A.
Figure 7B:
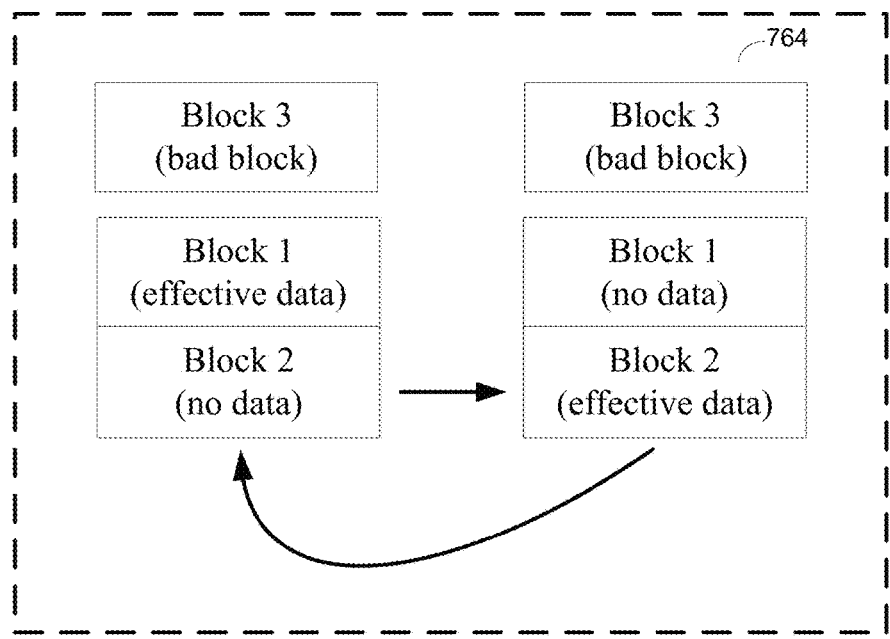

Default Configuration Modification Using Greater than Two Blocks with Bad Block Detection Now with reference to flowchart 700 of FIG. 7A and state diagram 750 of FIG. 7B, an example of an embedded configuration modification operation for a configuration settings data image stored in greater than two blocks of a non-volatile block of the memory array 160 will be described. FIG. 7A is a flowchart illustrating a configuration settings data update operation using greater than two blocks and a one-time programmable (OTP) block to store bad block information for an integrated circuit memory device like that of FIG. 1 and FIG. 7B is a state diagram illustrating example state transitions for the integrated circuit memory device resulting from the configuration update operation like that of FIG. 7A. In this example, three blocks are used to store the configuration settings data. Valid block label 124 stores information (e.g., valid block address) indicating the block having the configuration settings data that is valid. As shown in FIG. 7B, if more than 2 blocks are used to store configuration settings data, the blocks are used to store the configuration settings data in rotation. In this case, each block will be used to store the configuration settings data in sequence.

A one-time programmable (OTP) block is used to store bad block information for the configuration settings data store 161. If a bad block is encountered, the bad block information will be written to the OTP block. After power on, the memory 100 will read out the bad block information from the OTP block first and build the block list of available blocks and store it in the volatile register circuit 122. The sequence number is used in this implementation because there may be only two blocks left if bad blocks happen. The control logic 110 of memory 100 can identify which block is the newest one from the sequence number. A representative process for modifying the configuration settings data will now be described.

In block 702, a host command is received from the host 97A to change the non-volatile configuration register. In state 752, block 1 holds existing "effective" configuration settings data in use; the new configuration settings data will be stored to block 2 if a block erase is required. The procedure will continue until the new data is written to the last good block (block 3 in this example). Then the new data will be written back to the first good block. Valid block label 124 indicates that block 1 is valid configuration settings data. Block 2 and block 3 are empty/hold no data.

In block 703, a check for an empty block is made. If no empty block is found, then in block 712, the status is set to failure and the host 97A is signaled and no update is performed to the configuration settings data.

In block 704, the control logic 110 of memory 100 begins to store the new configuration settings data to the next empty block (block 2 in this example). The current example is 3 blocks, but may have bad block. Thus, there is no need for sequence number for 3 blocks, however, if one bad block happens, there are only two blocks and you need the sequence number is used to identify the latest one. In one implementation, the sequence number will be written anyway, irrespective of whether there are still more than 2 blocks or not. In this embodiment, the design scheme can be simplified because there is no need to consider whether there are 2 blocks or more than 2 blocks.

In block 705, a check for a bad block is made. If the program operation of block 704 did not encounter a bad block, then control passes to block 706. Otherwise if a bad block was encountered during the program operation of block 704, then control passes to block 711.

In block 706, after the new configuration settings data is successfully stored into block 2, the control logic 110 of memory 100 sets the valid block label to block 2.

In block 707, a check for a bad block is made. If the program operation of block 706 did not encounter a bad block, then control passes to block 708. Otherwise if a bad block was encountered during the program operation of block 706, then control passes to block 711.

In block 708, the control logic 110 erases the block 1 and resets the valid block label for block 1, readying it for next update. In state 758, block 2 contains the new configuration settings data written in block 704 and is marked with the valid block label by block 706. Block 1 is empty after the erase operation of block 708.

In block 709, a check for a bad block is made. If the erase operation of block 708 did not encounter a bad block, then the update is complete and the host 97A is signaled. Otherwise if a bad block was encountered during the erase operation of block 708, then control passes to block 710.

In block 710, the bad block is recorded with the OTP block and removed from the available block list. The update is complete and the host 97A is signaled.

In block 711, the bad block is recorded with the OTP block and removed from the available block list, then control passes to block 714 to program the configuration settings data to the next empty block. In state 764 of FIG. 7B, block 1 is empty after erasure. Block 3 has been marked bad block and removed from the available block list. Block 1 remains empty.

In block 714, a check is made if there are any empty blocks available. If an empty block is found, then control passes to block 704. Otherwise, if no other empty blocks are available, then control passes to block 716, the status is set to failure and the host 97A is signaled and no update is performed to the configuration settings data.

Figure 8:
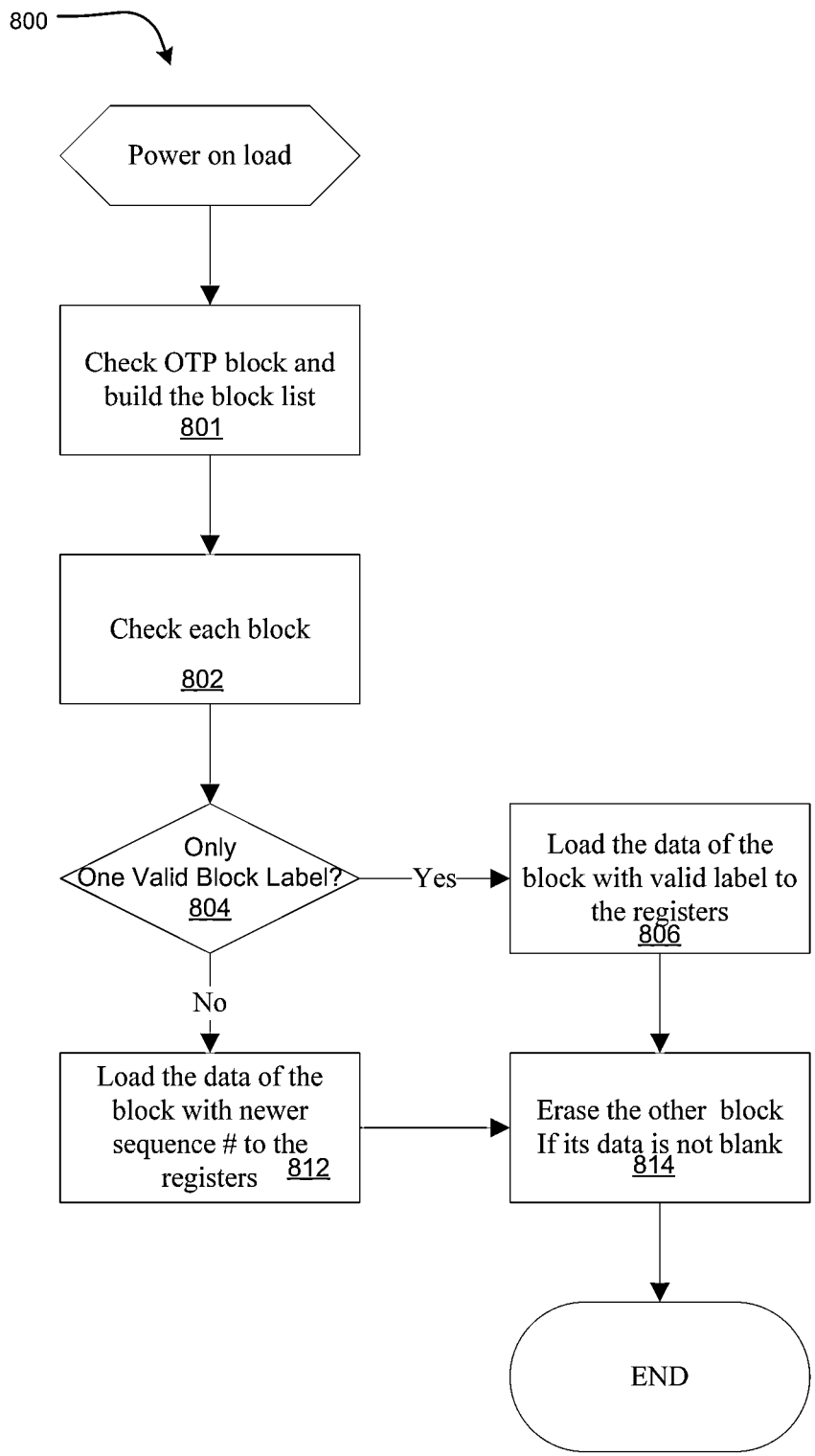
FIG. 8 is a flowchart illustrating a power on load of configuration information for another integrated circuit memory device using a default configuration update process like that of FIG. 7A.

Power on with New Configuration Information Using Greater than Two Blocks with Bad Block Detection Now with reference to flowchart 800 of FIG. 8, a power on process is described. FIG. 8 is a flowchart illustrating a power on load of configuration information for another integrated circuit memory device using a default configuration update process like that of FIG. 5A. After power on, the control logic 110 of memory 100 will search for the newest valid block and load the configuration settings data stored. The valid block label and sequence number are used to locate the valid block. In the case of one valid label is found by control logic 110, the valid block is the block with valid block label. In the case of two valid labels are found by control logic 110, the valid block is the block with newest (e.g., highest if incrementing) sequence number.

In block 802, the control logic 110 checks each block for the valid block labels.

In block 804, if there is only one valid block label found, then in block 806, the control logic 110 of the memory 100 loads the data of the block corresponding with the valid block label to the configuration registers 122.

Otherwise, if there are more than one valid block label, then in block 808, the control logic 110 loads the data of the block with newest sequence number to the volatile configuration registers 122.

In block 814, the control logic 110 erases the other block if its data is not blank.

In the event that the memory 100 may run out of available blocks and the host 97A cannot update anymore, applications that may require high safety and do not allow any failure cases, e.g., lifetime related application such as automotive application, the memory 100 supports a command that allows the host 97A to add more blocks to store the configuration settings data; thereby enabling the memory 100 to provide higher reliability.

For some applications, 3 or 2 blocks may be a sufficient number. For usages with greater requirements for reliability, e.g., several parts per billion (ppb), 1 or 2 additional blocks may be added by the user to achieve high reliability.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A byte is a basic storage unit used in many integrated circuit logic and memory circuits, and consists of eight bits. Basic storage unit can have other sizes, including for example one bit, two bits, four bits, 16 bits and so on. Thus, the description of a memory device set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units.

Particular Implementations

A device having a controller logic circuitry, and a method responsive to any one of a power on, a power on reset, and a command sequence including a default configuration update command, are described herein.

A device having a controller logic circuitry, and a method responsive to any one of a power on, a power on reset, and a command sequence including a default configuration update command, are described, including responsively examining validity of configuration settings data image.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers and retrieving a valid configuration settings data image from a memory block having a most recently stored configuration settings data.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers and retrieving the valid configuration settings data image of the block with a more recent sequence number to the configuration registers.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers, receiving and storing new configuration settings data in a block selected from the at least a first memory block and a second memory block, and after the new configuration settings data is successfully stored, marking by the logic circuitry the block selected as having valid configuration settings data.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers and retrieving the valid configuration settings data image of the block with a more recent sequence number to the configuration registers and writing labels or marks to trace progress of an update operation such that the new configuration settings data is marked valid only when the update is verified complete; thereby blocking a subsequent loading of a partial or corrupt configuration settings data image during a power fluctuation or hardware fault.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers, receiving and storing new configuration settings data in a block selected from the at least a first memory block and a second memory block, and after the new configuration settings data is successfully stored, marking by the logic circuitry the block selected as having valid configuration settings data, determining whether a previous configuration settings data image is to be erased after the new configuration is successfully stored; and responsively erasing the previous configuration settings data image.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers, building a block list of available blocks available to store configuration settings data from the one-time programmable block; and removing a bad block encountered during an update or erase operation conducted upon the at least a first memory block and a second memory block from the block list of available blocks.

A device having a controller logic circuitry, and a method responsive to any one of a power on, a power on reset, and a command sequence including a default configuration update command, are described, including responsively examining validity of configuration settings data image from at least one of the first memory block and the second memory block to copy to one or more configuration registers, building a block list of available blocks available to store configuration settings data from the one-time programmable block; and removing a bad block encountered during an update or erase operation conducted upon the at least a first memory block and a second memory block from the block list of available blocks detecting a host command to add additional blocks to store the configuration settings data, and further including logic circuitry for performing adding the additional blocks to the block list of available blocks available to store configuration settings data from the one-time programmable block.

A device having a controller logic circuitry, and a method responsive to any one of a power on, a power on reset, and a command sequence including a default configuration update command, are described, including responsively examining validity of configuration settings data image from at least one of the first memory block, the second memory block, and third memory block to copy to one or more configuration registers, and receiving and storing new configuration settings data in the third memory block after the second memory block and receiving and storing new configuration settings data in the first memory block after the third memory block round robin.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
a memory array including a plurality of non-volatile memory locations arranged into blocks of memory locations including at least a first memory block and a second memory block that provide non-volatile storage of a plurality of configuration settings data images;

an input/output interface for exchanging data with at least a host;

one or more configuration registers that receive configuration settings data;

data path circuits connected between the memory array, configuration registers and the input/output interface;

command decoder circuitry that responsive to commands received at the input/output interface to read and write to memory locations in the plurality of non-volatile memory locations, directs read and write operations to blocks of storage locations among at least the first memory block and the second memory block; and logic circuitry that examines validity of the configuration settings data images stored in at least the first memory block and the second memory block, selects a valid configuration settings data image from at least one of the first memory block and the second memory block to copy to the one or more configuration registers of the memory device, finds more than one of the at least a first memory block and a second memory block marked as having valid configuration settings data, and retrieves a valid configuration settings data image from a memory block having a most recently stored configuration settings data.

2. The memory device of claim 1, wherein the logic circuitry finds more than one of the at least a first memory block and a second memory block marked as having valid configuration settings data, and wherein retrieving the most recently stored configuration settings data further includes:

retrieving the valid configuration settings data image of a block with a more recent sequence number to the one or more configuration registers.

3. The memory device of claim 1, further including the command decoder circuitry detecting a host command to update default configuration settings data, and further including logic circuitry for performing:

receiving and storing new configuration settings data in a block selected from the at least a first memory block and a second memory block, and after the new configuration settings data is successfully stored, marking by the logic circuitry the block selected as having valid configuration settings data.

4. The memory device of claim 3, wherein the marking further includes:

writing labels or marks to trace progress of an update operation such that the new configuration settings data is marked valid only when the update operation is verified complete; thereby blocking a subsequent loading of a partial or corrupt configuration settings data image during a power fluctuation or hardware fault.

5. The memory device of claim 4, further including:

determining whether a previous configuration settings data image is to be erased after the new configuration settings data is successfully stored; and responsively erasing the previous configuration settings data image.

6. The memory device of claim 5, wherein writing labels or marks to trace progress of an update operation further includes:

erasing a valid label for the previous configuration settings data image only when the update operation is verified complete; thereby blocking a subsequent loading of a partial or corrupt configuration settings data image during a power fluctuation or hardware fault.

7. The memory device of claim 1, further including a one-time programmable block to store bad block information, and further including logic circuitry for performing:

building a block list of available blocks available to store configuration settings data from the one-time programmable block; and removing a bad block encountered during an update or erase operation conducted upon the at least a first memory block and a second memory block from the block list of available blocks.

8. The memory device of claim 7, further including the command decoder circuitry detecting a host command to add additional blocks to store the configuration settings data, and further including logic circuitry for performing:

adding the additional blocks to the block list of available blocks available to store configuration settings data from the one-time programmable block.

9. The memory device of claim 1, further including a third memory block, and further including logic circuitry for performing:

receiving and storing new configuration settings data in the third memory block after the second memory block and receiving and storing new configuration settings data in the first memory block after the third memory block, round robin.

10. A method of maintaining multiple times updatable default configuration settings data in an array of non-volatile memory cells, the method comprising:

receiving by a memory device a host command to update default configuration settings data with new configuration settings data for configuring the memory device stored in non-volatile storage locations including at least a first memory block and a second memory block defined in the array of non-volatile memory cells of the memory device;

selecting, from among the at least a first memory block and a second memory block, a target block in which to store the new configuration settings data;

storing the new configuration settings data in the target block selected; and marking the target block selected as having valid configuration settings data once the new configuration settings data is stored;

detecting more than one of the at least a first memory block and a second memory block marked as having valid configuration settings data; and responsive to detecting more than one of the at least a first memory block and a second memory block marked as having valid configuration settings data, retrieving a valid configuration settings data image from a memory block having a most recently stored configuration settings data.

11. The method of claim 10, wherein the marking further includes:

writing labels or marks to trace progress of an update operation such that the new configuration settings data is marked valid only when the update operation is verified complete; thereby blocking a subsequent loading of a partial or corrupt configuration settings data image during a power fluctuation or hardware fault.

12. The method of claim 11, further including:

determining whether a previous configuration settings data image is to be erased after the new configuration settings data is successfully stored; and responsively erasing the previous configuration settings data image.

13. The method of claim 12, wherein writing labels or marks to trace progress of an update operation further includes:

erasing a valid label for the previous configuration settings data image only when the update operation is verified complete; thereby blocking a subsequent loading of a partial or corrupt configuration settings data image during a power fluctuation or hardware fault.

14. The method of claim 10, wherein retrieving the most recently stored configuration settings data further includes:
retrieving the valid configuration settings data image of a block with a more recent sequence number.

15. The method of claim 10, further comprising:
responsive to power up of the memory device, building a block list of available blocks available to store configuration settings data from a one-time programmable block that stores bad block information; and
removing a bad block encountered during an update or erase operation conducted upon the at least a first memory block and a second memory block from the block list of available blocks.

16. The method of claim 15, further including:
detecting by the memory device a host command to add additional blocks to store the configuration settings data; and
adding the additional blocks to the block list of available blocks available to store configuration settings data from the one-time programmable block.

17. The method of claim 10, further including:
storing new configuration settings data in a third memory block after the second memory block and receiving and storing new configuration settings data in the first memory block after the third memory block, round robin.

18. A memory device, comprising:
circuitry to receive by the memory device a host command to update default configuration settings data with new configuration settings data for configuring the memory device stored in non-volatile storage locations including at least a first memory block and a second memory block defined in an array of the memory device;
circuitry to select from among the at least a first memory block and a second memory block, a target block in which to store the new configuration settings data;
circuitry to store the new configuration settings data in the target block selected;
circuitry to mark the target block selected as having valid configuration settings data once the new configuration settings data is stored; and
circuitry to detect more than one of the at least a first memory block and a second memory block marked as having valid configuration settings data; and responsive to detecting more than one of the at least a first memory block and a second memory block marked as having valid configuration settings data, retrieve a valid configuration settings data image from a memory block having a most recently stored configuration settings data.

* * * * *